(12) United States Patent
Perlman et al.

(10) Patent No.: US 6,230,266 B1
(45) Date of Patent: May 8, 2001

(54) AUTHENTICATION SYSTEM AND PROCESS

(75) Inventors: Radia Joy Perlman, Acton; Stephen R. Hanna, Bedford, both of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/243,575

(22) Filed: Feb. 3, 1999

(51) Int. Cl.$^7$ .................................................. H04L 9/00
(52) U.S. Cl. ............................... 713/158; 713/156
(58) Field of Search ................... 713/156–158

(56) References Cited

U.S. PATENT DOCUMENTS

| | | | |
|---|---|---|---|
| 4,949,248 | * 8/1990 | Caro | 709/203 |
| 5,261,002 | 11/1993 | Perlman et al. | 380/30 |
| 5,349,642 | 9/1994 | Kingdon | 380/25 |
| 5,371,794 | 12/1994 | Diffie et al. | 380/21 |
| 5,418,854 | 5/1995 | Kaufman et al. | 380/23 |
| 5,481,613 | 1/1996 | Ford et al. | 380/30 |
| 5,535,276 | 7/1996 | Ganesan | 380/25 |
| 5,666,416 | 9/1997 | Micali | 380/23 |
| 5,687,235 | 11/1997 | Perlman et al. | 380/25 |
| 5,696,965 | * 12/1997 | Dedrick | 707/10 |
| 5,774,552 | 6/1998 | Grimmer | 380/25 |
| 5,781,724 | 7/1998 | Nevarez et al. | 395/186 |
| 5,812,748 | * 9/1998 | Ohran et al. | 714/4 |
| 5,818,936 | 10/1998 | Mashayekhi | 380/25 |
| 5,825,880 | * 10/1998 | Sudia et al. | 713/180 |
| 5,903,882 | * 5/1999 | Asay et al. | 705/44 |
| 6,049,776 | * 4/2000 | Donnelly et al. | 705/8 |

FOREIGN PATENT DOCUMENTS

04098556 * 3/1992 (JP) ................................ G06F/13/00
WO97/16905 9/1997 (WO) .

OTHER PUBLICATIONS

PCT International Search Report for International Application No. PCT/US001529, International Filing Date Jan. 21, 2000.
Technical Corrigenda to Rec. X.500/ISO/IEC 9594 resulting from Defect Reports 9594/128 by ISO/IEC JTC 1/SC 21/WG4 and ITU–T Q15/7 Collaborative Editing Meeting on the Directory, Ottawa, Canada, Jul. 1995, pp. 1–3.
Draft Amendments DAM 4 to ISO/IEC 9594–2, DAM 2 to ISO/IEC 9594–6, DAM 1 to ISO.IEC 9594–7, and DAM 1 and ISO/IEC 9594–8 on Certificate Extension by ISO/IEC JTC1/SC 21/WG4 and ITU–T Q 15/7 Collaborative Editing Meeting on the Directory, Ottawa.
Kaufman et al., "Network Security—Private Communication in a Public World", 1995, pp. 177–203.

* cited by examiner

Primary Examiner—Tod Swann
Assistant Examiner—Stephen Kabakoff
(74) Attorney, Agent, or Firm—Cesari and McKenna, LLP

(57) ABSTRACT

An authentication method and process are provided. One aspect of the process of the present invention includes authorizing a first on-line revocation server (OLRS) to provide information concerning certificates issued by a certificate authority (CA) that have been revoked. If the first OLRS is compromised, a second OLRS is authorized to provide certificate revocation information, but certificates issued by the CA remain valid unless indicated by the second OLRS to be revoked.

87 Claims, 9 Drawing Sheets

AUTHENTICATION SYSTEM AND PROCESS

BACKGROUND OF THE INVENTION

1. Field of the Invention

The present invention relates generally to a computerized authentication system and process that utilize public key cryptography, and more specifically, to such a system and method that are able to re-establish authentication system security after compromise of same.

2. Brief Description of Related Prior Art

In a distributed data processing network system, a methodology employed to reliably verify the identity of a communicating device on the network prior to allowing the device to access system operations and resources is referred to as authentication. Access to the system may be, for example, for the purpose of communicating with other users, retrieving secure information, or receiving a service. Distributed systems generally include various computer nodes interconnected by a communications medium. The computer nodes may include nodes that are directly accessed by users, e.g., workstations, and nodes running specialized applications, e.g., servers. These nodes, the processes running on these nodes, and the users of the distributed system are referred to as "principals." The authentication exchange is performed on behalf of the principals.

Public key cryptography is a method of secure communication in which each principal has a public encryption key and a private encryption key. An encryption key is a code or number which, when taken together with an encryption algorithm, defines a unique transformation that is used to encrypt or decrypt data. A public key system may be used in such a way as to ensure confidentiality of the information being transmitted, i.e., to ensure that the information may not be understood by an eavesdropper, as well as to ensure the authenticity of the sender of the information.

The manner in which a public key cryptography system operates to ensure authentication may be understood without reference to the mathematical transformations that are used for encryption and decryption. Public key cryptography is also referred to as "asymmetric" encryption because information encoded with a public key may be decoded only by using an associated private key and vice versa, the associated private and public keys defining a private/public key pair. According to this type of encryption, the private key is known only to the owner of the key, while the public key is known to other principals in the system.

Accordingly, to effect a secure transmission of information to a recipient, a principal encodes ("encrypts") the information with the recipient's public key. Since only the intended recipient has the complementary private key, only that principal can decode ("decrypt") it. On the other hand, to prove to a recipient of information that the sender is who he purports to be, the sender encodes ("signs") the information with its private key. If the recipient can decode ("verify") the information using the sender's public key, it knows that the sender has correctly identified itself. In public key cryptography, each principal is responsible for knowing its own private key and all the public keys are generally kept in a convenient location, typically a directory service (DS). Alternatively, each principal may store its own public key, furnishing it to a recipient during an authentication exchange.

It is essential to reliably know which public key belongs to which principal. The typical solution for this problem is to use a trusted entity known as a certificate authority (CA). A CA generates identity certificates, which are signed messages specifying a "subject," i.e., the name of the principal whose public key is being certified, the certificate serial number, name of the CA issuing the certificate, the subject's public key, and also, typically, a certificate expiration date. This verification of the relationship between the public key and the principal to which it belongs precludes an intruder from compromising the system by posing as a valid principal. Since each certificate is signed by the private key of the CA to ensure the authenticity of the certificate itself, all principals in the network that are required to authenticate a principal must somehow securely learn the CA's public key so that they can verify its signature on the certificates. Certificates may be stored in any convenient location, such as a DS, or each node can store its own certificate and furnish it as part of the authentication exchange. Typically, in order to provide enhanced security, the CA is an off-line entity and communicates to network principals via secure off-line communications techniques.

For complete network security, every principal must have a certificate. Sometimes, however, it is desirable to later disable a certificate after it has been issued but prior to its expiration. For example, a principal's private key may be stolen, compromised or lost, etc. Under such circumstances, it is desirable to revoke the certificate, thereby disabling authentication via that certificate.

Various schemes have been developed to revoke unexpired certificates. In one conventional approach, all valid principal certificates are stored on-line in some location, such as a DS, and are publicly available for retrieval. For example, when a user needs to authenticate to a server, the server polls the DS to see if the user's certificate is present in the DS. If a user's certificate is not stored in the DS, then it is concluded that the certificate has been revoked.

Another conventional approach is to issue a list from the CA of unexpired certificates that should not be honored, referred to as a Certificate Revocation List (CRL). The Certificate Revocation List may have a format defined by the ITU-T Recommendation X.509, formally referred to as the ISO/IEC 9495-8: Information Technology-Open Systems Interconnection-The Directory-Authentication Framework, 1988 (revised 1993). An application considers a certificate as valid if it has not expired and is not listed in the CA's current CRL. Unfortunately, since a CRL can become quite large over time (i.e., as an ever greater number of certificates are revoked and added to the CRL), it can consume a large amount of network bandwidth, storage space, and CA processing power to distribute the CRL to all network nodes desiring the information contained in the CRL. Due to the difficulty involved in obtaining a CRL, this means that the CRL will typically not be compiled frequently, thus the CRL may be out of date.

One conventional approach to solving this problem involves use of an on-line revocation server (OLRS). The OLRS maintains a database of certificate revocation status information that may include, for instance, information derived from the version of CA's CRL that was most recently provided to it, and real-time information that it receives via secure channels that other unexpired certificates issued by the CA have been revoked. The OLRS makes its certificate revocation information available on-line to network principals that may ask the OLRS for it. That is, network principals may make on-line queries to the OLRS for certificate revocation information, and the OLRS provides responses to such queries based upon the OLRS' certificate revocation status information. Because the OLRS responds to specific on-line queries, its responses can be more timely than information provided by the off-line CA and be more efficient because it includes only the information requested.

Unfortunately, the relatively greater access to the OLRS provided by the fact that it is an on-line, and perhaps replicated entity (as opposed to the CA, which typically is off-line) inherently reduces OLRS security and increases likelihood of compromise of the OLRS (e.g., theft of the OLRS private key and/or unauthorized modification of the certificate revocation status information in the OLRS). Therefore, it is important that the OLRS have a different private key from the CA because the OLRS is more susceptible to compromise as a result of the OLRS being on-line; however, compromise of the OLRS private key is less of a security threat than compromise of the CA's private key, since compromise of the OLRS private key only means that previously revoked certificates may be indicated to inquiring principals as unrevoked or unrevoked certificates may be indicated to inquiring principals as revoked, whereas compromise of the CA's private key may result in unauthorized issuance of certificates.

Conventionally, the OLRS authenticates the certificate revocation status information provided by the OLRS as a result of queries by inquiring principals by signing the query results using the OLRS private key. The CA also certifies the authenticity of the OLRS's public key by providing a "delegation certificate" to the OLRS which is signed by the CA's private key and which contains information in addition to that in an ordinary certificate (e.g., identifying that this is an authorization to the specified OLRS from the CA to provide certificate revocation status information). The delegation certificate may be provided to verifying principals to verify that the OLRS is authorized to provide the certificate revocation status information.

In the event that it is determined that the OLRS has been compromised, one possible solution is to treat the CA as if it has also been compromised, even if it is known that the CA has not been compromised. There is no conventional way to revoke the CA's delegation certificate to the OLRS, because it is the OLRS that is relied upon for revoking certificates issued by the CA including the delegation certificate. If the CA is treated as if it has been compromised, in order to re-establish authentication system security it becomes necessary to (1) discontinue use of the current CA and OLRS, (2) begin using a new CA and OLRS, each of which have new respective private/public key pairs that are different from those used by the CA and OLRS that are no longer being used, (3) notify all other certificate authorities that previously issued certificates for the current CA's public key that such certificates should now be revoked, and (4) issue new certificates signed by the private key of the new CA that recertify principals' valid public keys that had been previously certified by the CA whose use is being discontinued.

The above-described conventional technique for re-establishing authentication system security involves needless consumption of significant amounts of administrative overhead to issue new certificates from the new CA to recertify principals' valid public keys. Thus, it would be desirable to provide an authentication system and process that are able to efficiently and securely re-establish authentication system security after compromise of an OLRS, but that do not require issuing of new certificates from a new CA to recertify previously certified, valid public keys.

SUMMARY OF THE INVENTION

In accordance with the present invention, a computerized authentication system and process are provided wherein the CA associated with an OLRS is not assumed to have been compromised if the OLRS is compromised. Unless it is actually known that the CA has been compromised, certificates issued by the CA are permitted to remain valid. A second OLRS is authorized by the CA to provide certificate revocation status information, and notification is provided that only such information provided by the second (non-compromised) OLRS is considered valid.

In broad concept, one aspect of the present invention provides a process in which, if a first OLRS is compromised, but the CA is not believed to have been compromised, a second OLRS is authorized to provide certificate revocation status information, and notification is provided (via information contained in one or more signed delegation certificates) that the certificates issued by the CA are to be considered valid unless they are indicated by the second OLRS to be revoked.

In another aspect of the present invention, the authentication system includes multiple on-line revocation servers, and a novel technique is provided to ascertain if one of the servers has been compromised. In this technique, the certificate revocation information provided by the servers may be checked against each other and/or the CA in order to determine whether differences exist in the information that would indicate that one or more of the servers has been compromised, and if so, to revoke authorization provided to the compromised on-line revocation server(s) to provide such information. Advantageously, the present invention eliminates the need to issue new certificates to recertify previously certified, valid public keys, without significantly reducing authentication system security.

These and other features and advantages of the present invention will become aparent as the following Detailed Description proceeds and upon reference to the Drawings, wherein like numerals depict like parts, and in which:

It should be understood that although the following Detailed Description will proceed with reference to preferred embodiments and methods of use, the present invention is not intended to be limited to these preferred embodiments and method of use. Rather, many alternatives, modifications, and variations will be apparent to those skilled in the art, and the present invention is intended to be viewed broadly as being limited only as set forth in the accompanying claims.

DETAILED DESCRIPTION OF ILLUSTRATIVE EMBODIMENTS

Figure 1:
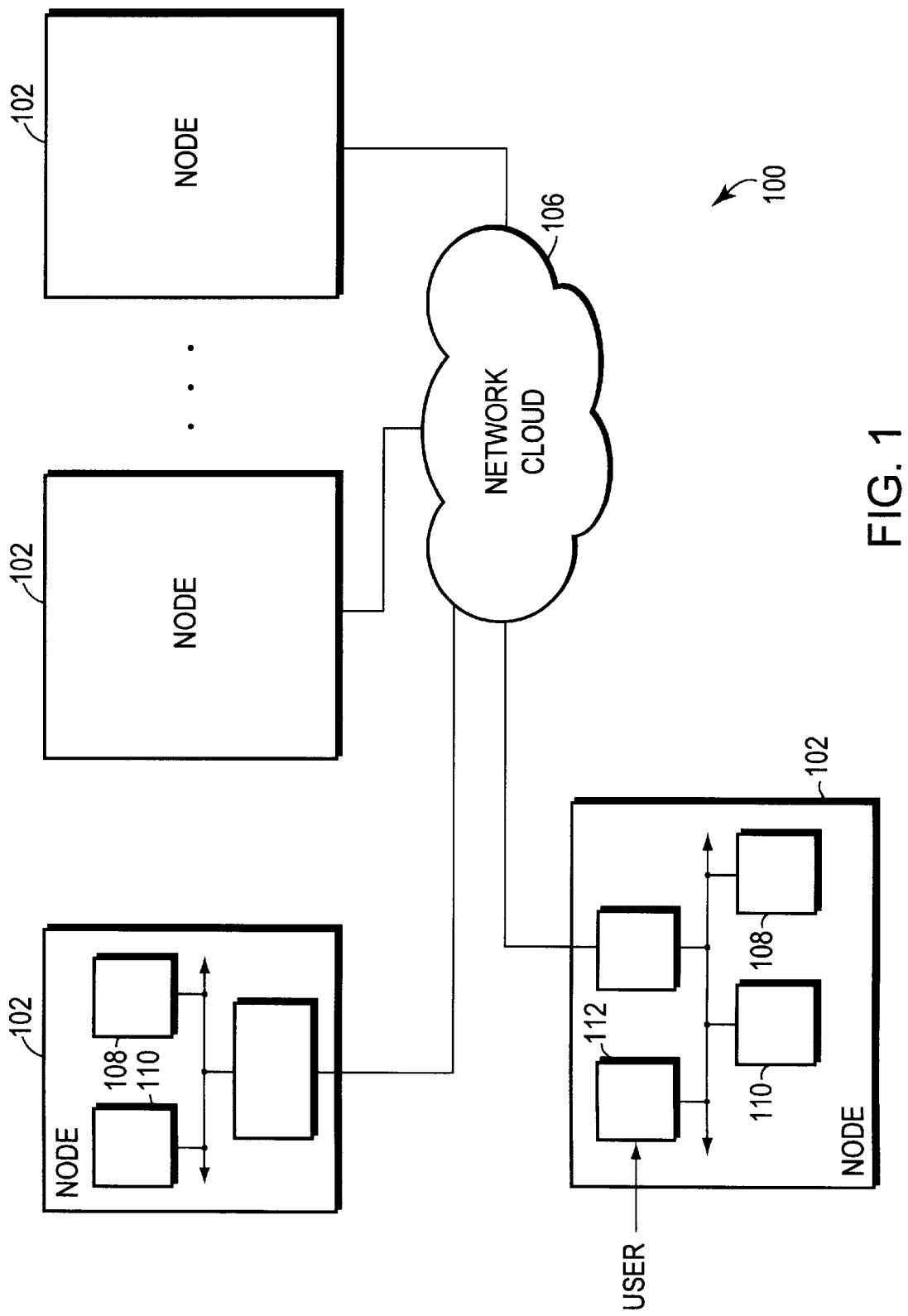
FIG. 1 is a highly schematic functional diagram of a distributed data processing network in which the present invention may be advantageously used.

FIG. 1 illustrates a distributed, public key data processing network 100 wherein the present invention may be advantageously used. Network 100 includes a plurality of computer nodes 102 interconnected by a network communications system (represented by network cloud 106). In general, each of the computer nodes includes computer-readable memory 108 for storing software programs and data structures associated with, and for carrying out the cryptographic methods and techniques, and the inventive processes and techniques described herein. In addition, the nodes further include processor 110 for executing the software programs, including various algorithms for generating numbers and codes associated with, e.g., passwords, private/public key pairs and for manipulating the stored data structures. It will be apparent to those skilled in the art that other processors and memories may be used within the teachings of the invention to implement the authentication and other security-related techniques described herein. Each of the computer nodes 102 may store a respective public/private key pair which it uses in authentication exchanges with other nodes.

Figure 2:
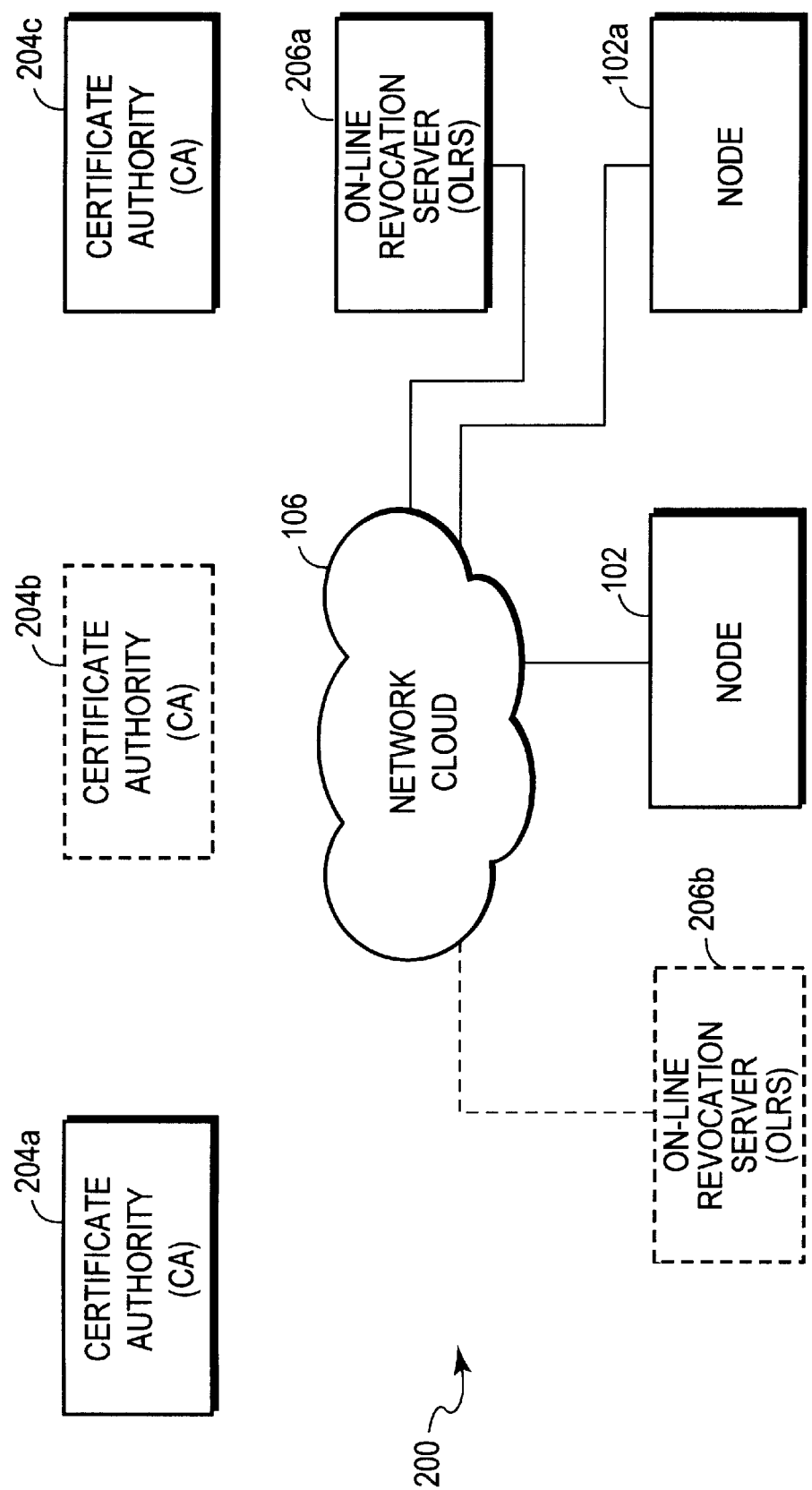
FIG. 2 is a highly schematic functional diagram of one exemplary embodiment of the system of the present invention.

One embodiment 200 of the system of the present invention is illustrated in FIG. 2. As shown in FIG. 2, system 200 includes a first CA 204a, a first OLRS 206a associated with the first CA 204a, a second CA 204b, a second OLRS 206b associated with the second CA 204b, a third CA 204c, and one or more nodes 102, connected together via network system 106. CA 204b and OLRS 206b initially are not present in the system 200 (i.e., prior to compromise of OLRS 206a), and in order to illustrate this, CA 204b and OLRS 206b are shown in dashed lines in FIG. 2. Additionally, each CA 204a, 204b, 204c preferably is an off-line entity, and therefore, is not shown as being connected to the network system 106.

Figure 9:
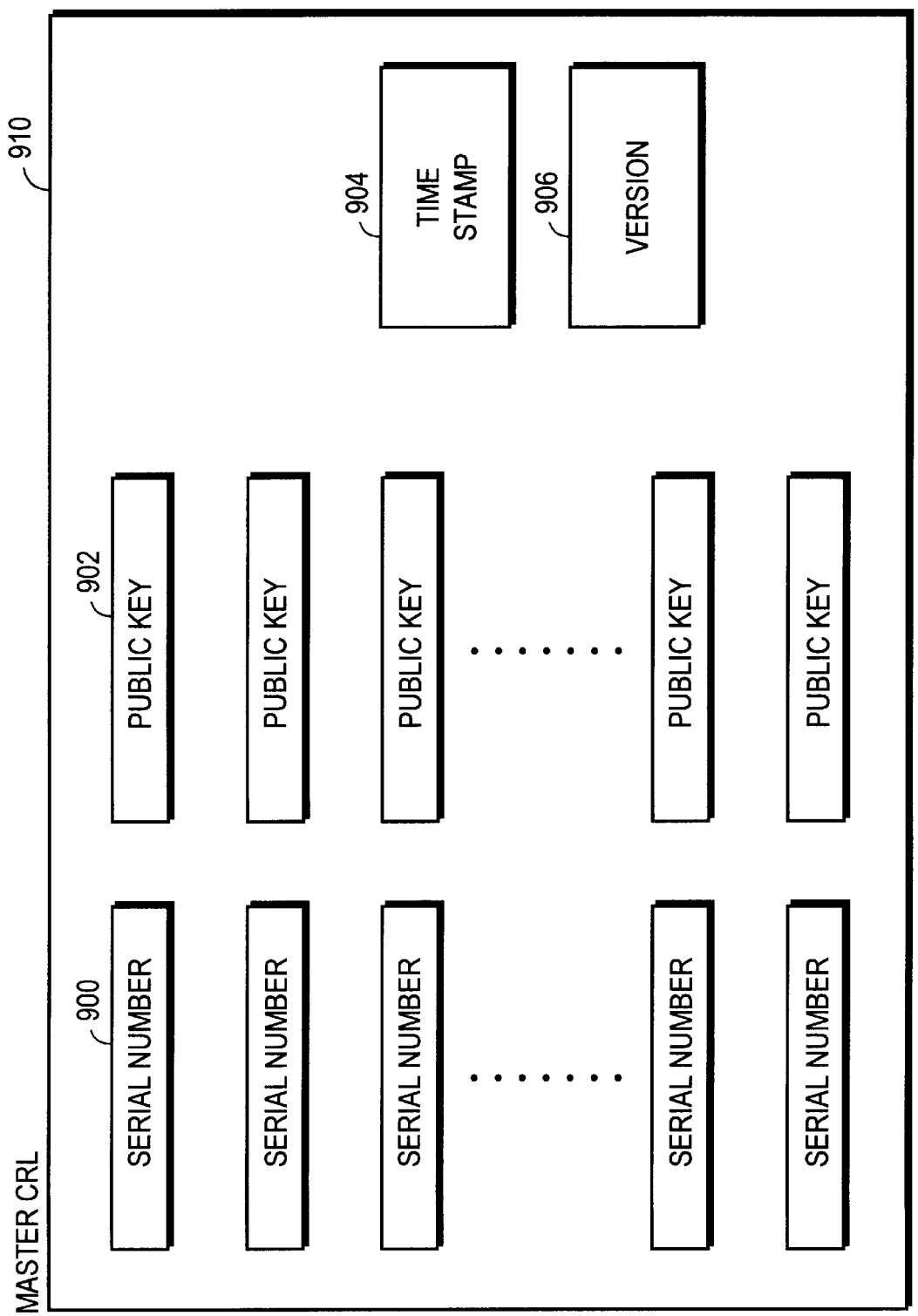
FIG. 9 is a symbolic representation of the data structure of a master CRL.

Principals request, via trusted off-line communications techniques, the CA 204a to issue certificates authenticating their public keys, and CA 204a issues such certificates. CA 204a is informed via secure communications techniques which unexpired certificates should no longer be honored. As illustrated in FIG. 9, the CA 204a stores the serial numbers 900 of these revoked certificates (and, e.g., other information, such as the public keys 902 associated with the revoked certificates) in a master CRL 910 at the CA 204a. Time stamp information 904 indicating date and time of creation of the CRL 910, and version number 906, which together indicate when CRL 910 was last updated may also be included in the master CRL 910.

OLRS 206a is a specialized server that provides a verifying principal, such as one or more of the nodes 102, with certificate revocation information. More specifically, in system 200, the OLRS 206a may obtain, via secure off-line communications, or other means the information contained in the master CRL stored at the CA 204a. The OLRS 206a may augment the master CRL information with real-time information obtained via secure channels of additional unexpired certificates issued by the CA 204a that have been revoked. The master CRL and real-time information stored at the OLRS 206a together form the certificate revocation status information that is available to inquiring principals. A verifying principal may query the certificate revocation status information stored at the OLRS 206a to determine whether particular certificates specified in the query have been revoked. The OLRS 206a authenticates the result of a particular query, either by signing the result using its private key, or by employing a secret session key negotiated between the verifying principal and the OLRS 206a for use in their current communications session. The OLRS 206a may also provide to inquiring principals certificates indicating whether the particular certificates specified in the query have been revoked, and/or the delegation certificate provided to it by the CA 204a authorizing the OLRS to provide certificate revocation status information. The delegation certificate of the OLRS 206a may be stored at the OLRS 206a and/or network directory (not shown).

Ideally, the OLRS 206a should reside in a physically secure node configured with "trusted" software, e.g., limiting the functions it performs to only providing the certification revocation information services, in order to reduce the possibility that the OLRS 206a will be compromised (e.g., via unauthorized access to and/or tampering with the OLRS private key and/or certificate revocation status information, etc.). However, if the CA 204a determines (e.g., in accordance with techniques that will be described below or conventional techniques) that the OLRS 206a has been compromised, a second (i.e., uncompromised) OLRS 206b, having substantially the same configuration and operation as OLRS 206a, is made part of the system 200, along with a second CA 204b.

Assuming that the CA 204a has not actually been compromised, the CA 204b generates, after compromise of the OLRS 206a is detected, a special delegation certificate 500 (e.g., containing, in addition to the subject 504, certifying CA identification 506, serial number 508, OLRS public key 510, and information 512 designating that this is a delegation certificate, special information 502 described below) for the OLRS 206b that authorizes the OLRS 206b to provide certificate revocation status information on behalf of the CA 204b, signs the special delegation certificate using the private key belonging to CA 204b, and supplies the signed delegation certificate to the OLRS 206b and/or network directory service (not shown). After verifying that the special delegation certificate is properly signed by the CA 204b, the OLRS 206b then begins to supply certificate revocation status information and copies of the special delegation certificate to verifying principals. Alternatively, if the OLRS 206b is unable to verify that the special delegation certificate is properly signed by the CA 204b, the delegation certificate is ignored.

The special information contained in the special delegation certificate notifies verifying principals furnished with the delegation certificate that certificates issued by the CA 204a, except the delegation certificate authorizing compromised OLRS 206a to provide certificate revocation status information on behalf of CA 204a, should continue to be honored as valid, but that all inquiries regarding revocation of certificates issued by CA 204b should be directed to the uncompromised OLRS 206b, as the OLRS 206a has been compromised.

Figure 6:
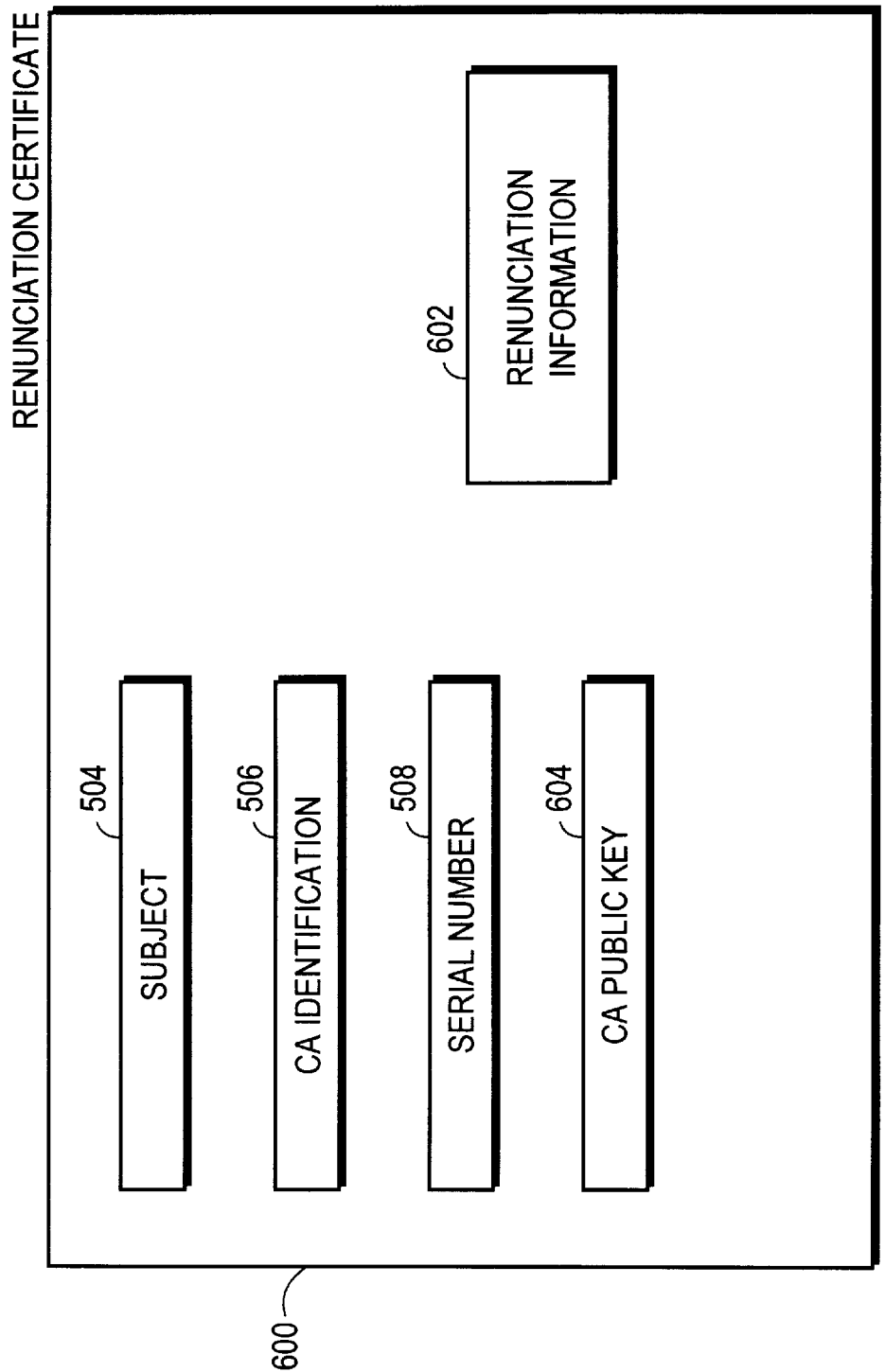
FIG. 6 is a symbolic representation of the data structure of a renunciation of certificate which may be used in the embodiment of FIG. 2.

In system 200, one or more additional certificate authorities 204c may also be present, which authorities 204c may have issued certificates certifying the public key of the CA 204a prior to compromise of the OLRS 206a. In order to update the certificates previously issued by certificate authorities 204c so as to ensure that principals relying upon such certificates now recognize the validity of certificates (including the special delegation certificate) issued by the successor CA 204b, CA 204a may issue, via secure off-line techniques, to certificate authorities 204c a "renunciation" certificate 600 (the data structure of which is represented in FIG. 6) signed using the private key of the CA 204a including information 602 stating that the CA 204a has renounced all of its certification authority (i.e., power to issue certificates), and has granted that authority to the CA 204b. These renunciation certificates reference the public key 604 of the CA 204b, and indicate that the renunciation of authority by CA 204a is irrevocable. Additionally, in system 200, the new CA 204b is configured to issue certificates in the same name as the CA 204a. Thus, in essence, the renunciation certificates issued by CA 204a indicate that the public key for the CA 204a issuing same has changed from that belonging to CA 204a to that belonging to CA 204b. The authorities 204c receiving such renunciation certificates from CA 204a verify that the renunciation certificates have been properly signed by the CA 204a, and if so, respond by updating their certificate information and may transmit, via secure means, receipt acknowledgments to the CA 204a (or to an appropriate network management utility executing on another node of the network). Such acknowledgments may include new certificates from the authorities 204c certifying the public key of the CA 204b.

Alternatively, other off-line communications may be used to communicate the renunciation of certifying authority by the CA 204a in favor of the CA 204b. Such mechanisms may include verbal communication between attendant personnel of authorities 204a and 204c via conventional telephonic means. Also alternatively, authorities 204c and principals in the network may be configured to periodically check with the CA 204a to ascertain whether the certification authority of the CA 204a has changed (e.g., whether the CA 204a has renounced such authority in favor of a successor CA 204b).

Figure 3:
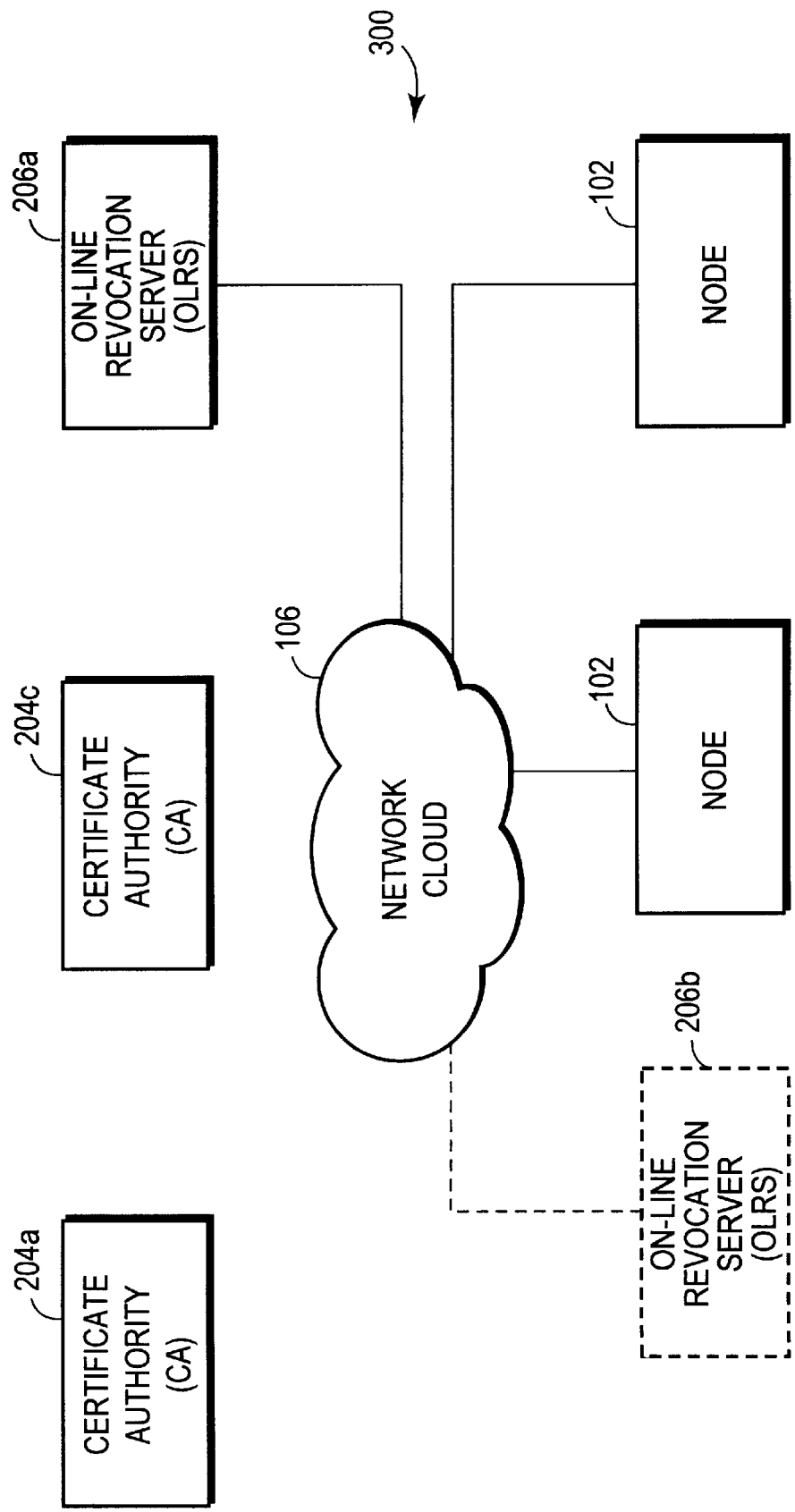
FIG. 3 is a highly schematic functional diagram of another exemplary embodiment of the present invention.

FIG. 3 illustrates another embodiment 300 of an authentication system according to the present invention. As shown in FIG. 3, system 300 includes a CA 204a, a first OLRS 206a associated with the CA 204a, a second OLRS 206b also associated with the CA 204a, and one or more nodes 102, connected together via network system 106. OLRS 206b initially is not present in the system 200 (i.e., prior to compromise of OLRS 206a), and in order to illustrate this, OLRS 206b is shown in dashed lines in FIG. 3. is Except as stated hereafter, the functions and operation of the CA 204a, OLRS 206a, and nodes 102 in system 300 are the same as their counterparts in system 200.

In system 300, after the CA 204a determines that the OLRS 206a has been compromised, a second (i.e., uncompromised) OLRS 206b, having substantially the same configuration and operation as OLRS 206a, is made part of the system 300. The certificate revocation status information stored at the new OLRS 206b may indicate that the delegation certificate of the OLRS 206a has been revoked. The CA 204a then generates a delegation certificate for the OLRS 204b (i.e., that authorizes the OLRS 204b to provide certificate revocation status information on behalf of the CA 204a), signs the delegation certificate using its private key, and supplies the signed delegation certificate to the OLRS 206b.

Figure 7:
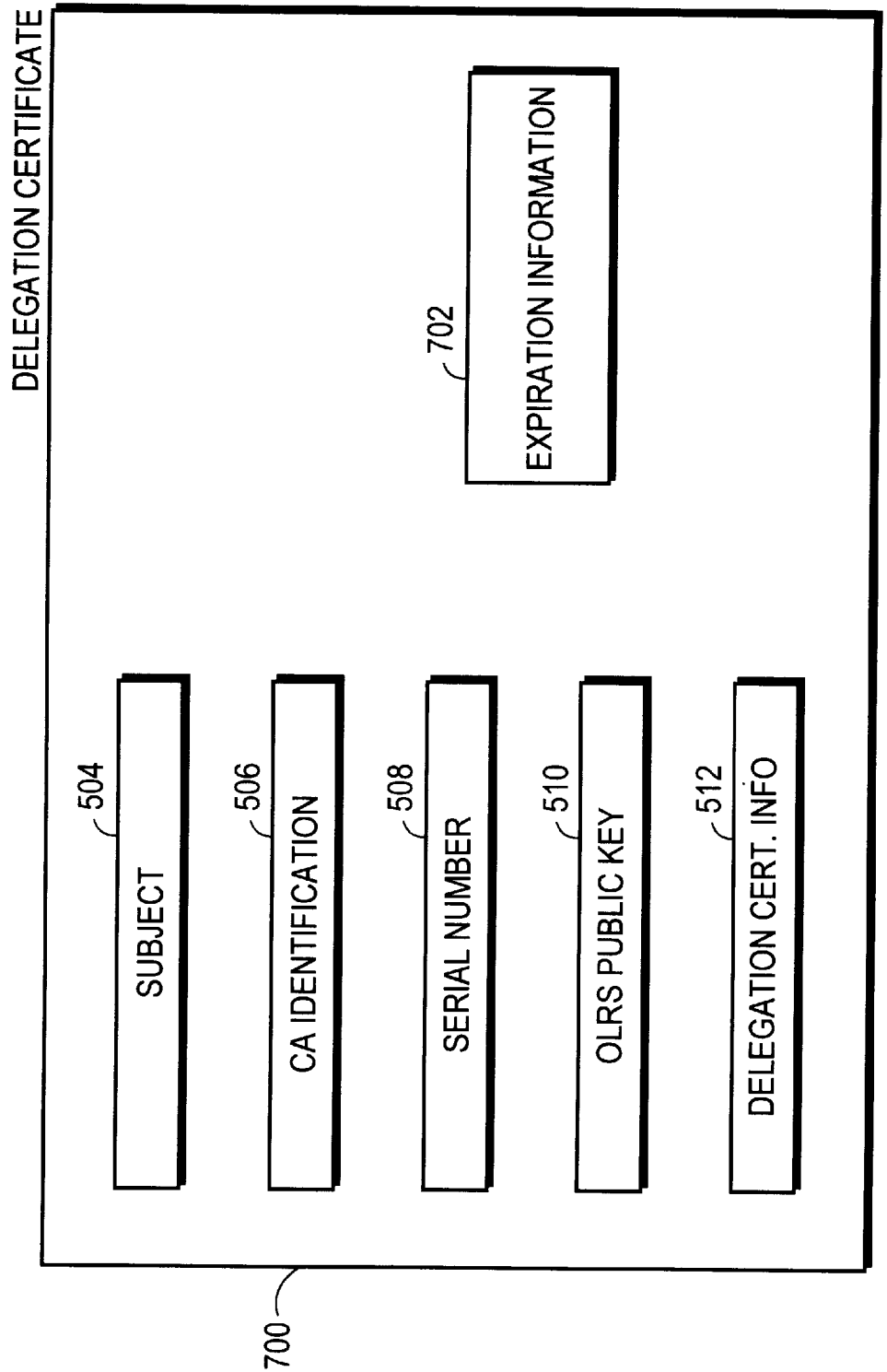
FIG. 7 is a symbolic representation of the data structure of a delegation certificate that may be used in the embodiment of FIG. 3.

In system 300, these delegation certificates (the data structure of one 700 of which is shown in FIG. 7) provided to the servers 206a, 206b by the CA 204a contain expiration information fields (a respective one 702 of which is shown in FIG. 7) that indicate that these certificates expire after the dates stated therein. These dates are chosen to cause the delegation certificates to expire frequently (e.g., the day after issuance by the CA 204a) so as to severely limit the amount of time that a compromised OLRS 206a may appear to verifying principals to have authority to issue certificate revocation status information on behalf of the CA 204a. That is, since verifying principals use the delegation certificates provided to the servers 206a, 206b by the CA 204a to verify whether the servers 206a, 206b are in fact authorized to provide certificate revocation status information on, if the compromised OLRS 206a is unable to provide an unexpired delegation certificate from the CA 204a to a verifying principal, the verifying principal will not consider the certificate revocation status information provided by the OLRS 206a to be valid.

Thus, in system 300, after it is determined that a given OLRS 206a has been compromised, the CA 204a simply permits the delegation certificate that it most recently issued to the compromised OLRS 206a to expire, and provides a fresh (i.e., unexpired) delegation certificate to uncompromised OLRS 206b to authorize OLRS 206b to provide certificate revocation status information. Thereafter, so long as the currently authorized OLRS 206b has not been compromised, the CA 204a provides a fresh delegation certificate to that OLRS 206b to maintain its authorization to provide the certificate revocation status information.

Batches of fresh delegation certificates may be generated and stored securely at the CA 204a, or such certificates may be generated singly, as needed, by the CA 204a. Any fresh delegation certificate stored at, and not yet issued by, the CA 204a is destroyed after compromise of the OLRS named as subject in the certificate is detected.

Verifying principals in system 300 may be configured to request from the CA 204a, after receipt of an expired or otherwise invalid (e.g., not properly signed by the CA 204a) delegation certificate (e.g., from the compromised OLRS 206a), the most recent, unexpired delegation certificate yet issued by the CA 204a that authorizes an uncompromised OLRS 206b to provide certificate revocation status information. Thus, in system 300, after OLRS compromise, CA 204a continues to issue valid identity certificates, the certificates issued by CA 204a prior to such compromise are considered valid by verifying principals unless they are indicated by an uncompromised OLRS 206b to be revoked, and after expiration of the most recent delegation certificate issued to the compromised OLRS 206a, verifying principals no longer accept as authorized by the CA 204a the certificate revocation status information provided by the compromised OLRS 206a.

Thus, an elegant and straightforward technique is provided in system 300 to re-establish authentication system security after compromise of an OLRS, which technique severely limits the amount of time available to effect damage to system security after OLRS compromise. Additionally, this technique does not suffer from the aforesaid disadvantages of the prior art.

Figure 8:
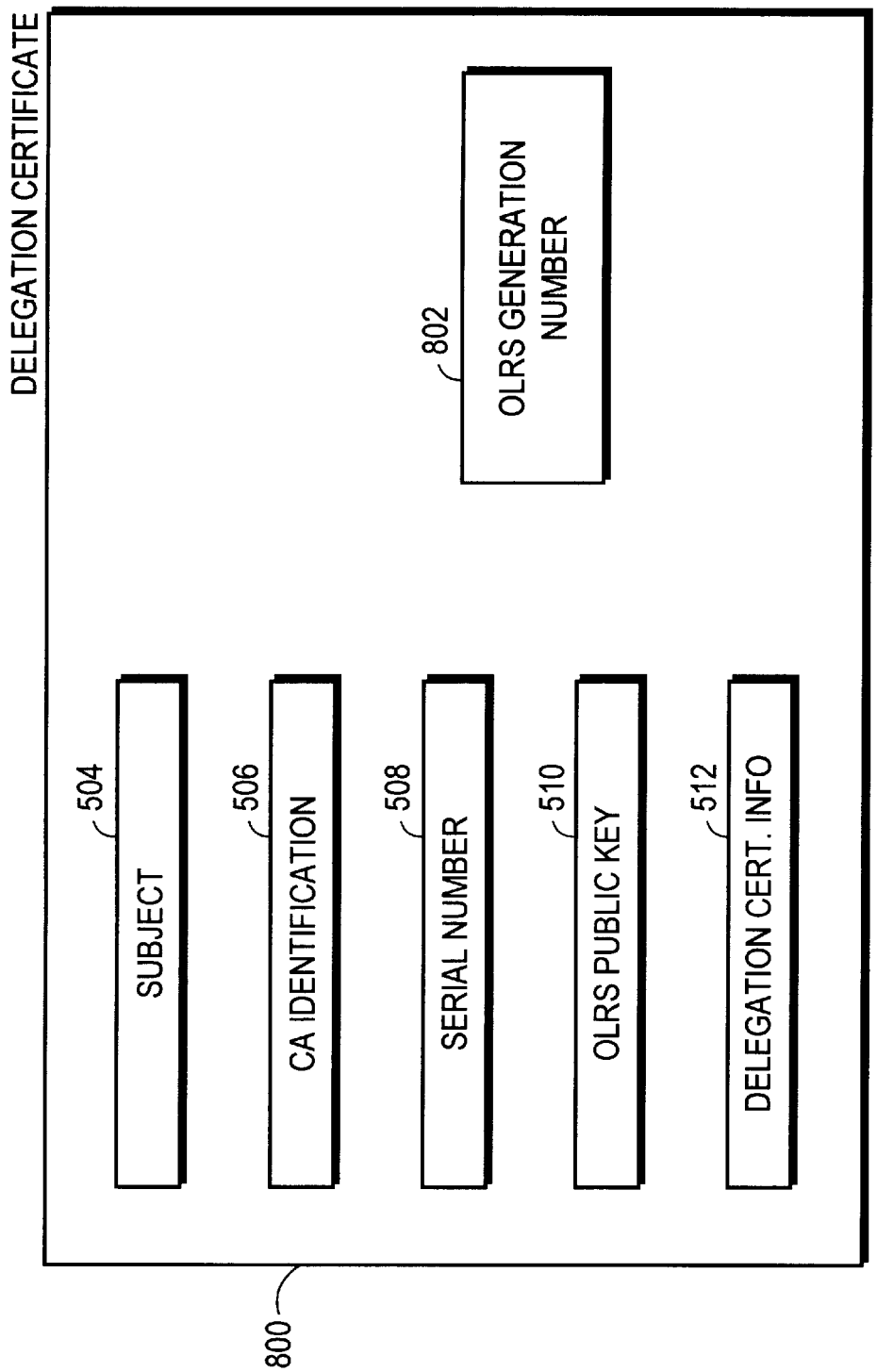
FIG. 8 is a symbolic representation of the data structure of a variation of the delegation certificate of FIG. 7.

Alternatively, in system 300, rather than causing the delegation certificates issued by the CA 204a to the servers 206a, 206b to expire frequently, such certificates may instead contain a special "OLRS generation" field 802 that specifies the order in which the subject OLRS identified in the delegation certificate was authorized to provide certificate revocation status information, relative to when any other OLRS was so authorized. The data structure of one such alternative delegation certificate 800 is shown in FIG. 8. For example, in this alternative technique, prior to compromise of the first OLRS 206a, any delegation certificate, authorizing the OLRS 206a to provide certificate revocation status information for certificates issued by CA 204a, contains in the OLRS generation field the number "1," which number indicates that OLRS 206a is the first OLRS in the system 300 to be so authorized. Thereafter, if the OLRS 206a is compromised, the delegation certificate issued by the CA 204a to authorize the new OLRS 206b to provide certificate revocation status information contains in its OLRS generation field the number "2," which number indicates that the uncompromised OLRS 204b is the second OLRS to be so authorized by the CA 204a. These delegation certificates may also be supplied by the CA 204a to the authorities 204c, which after receiving same, verify that they are properly signed by the CA 204a. If the delegation certificates are not properly signed by the CA 204A, they are ignored by the authorities 204c.

Otherwise, after receiving properly signed delegation certificates from the CA 204a, an authority 204c checks to see whether the delegation certificate contains an OLRS generation number that is greater than the greatest OLRS generation number yet contained in a properly signed delegation certificate received by the authority 204c, and if so, the authority 204c records the greater OLRS generation number (contained in the most recently received delegation certificate), and revokes any certificate previously issued by the authority 204c that certified the public key of CA 204a.

In this alternative, the certificates issued by the CA 204c to certify the public key of CA 204a also contain respective OLRS generation number fields for specifying the greatest OLRS generation number yet recorded by the authority 204c. Thus, after revoking the previous certificates issued by the CA 204c to certify the public key of CA 204a, the authority 204c issues a certificate that again certifies the public key of the CA 204a, but that also includes an OLRS generation field for CA 204a containing the highest OLRS generation number yet recorded by the authority 204c. Thus, any verifying principal seeking to authenticate the public key of CA 204a via certificates issued by CA 204c will also be notified by such certificates of the highest OLRS generation number yet contained in any delegation certificates, properly signed by CA 204, that have been received by CA 204c.

In this alternative, verifying principals do not honor any delegation certificate unless the OLRS generation number specified therein is greater than or equal to the greatest OLRS generation number recited in the certificates issued by CA 204c to certify the public key of the CA 204a. Thus, after receiving such notification, verifying principals will not accept as valid the delegation certificate authorizing OLRS 206a to provide certificate revocation status information, since this delegation certificate has an OLRS generation number of "1," while the highest OLRS generation number yet recited in the certificates s issued by CA 204c to certify the public key of the CA 204a is "2." Thus, the verifying principal will no longer accept as authorized certificate revocation status information provided by compromised OLRS 206a.

Figure 4:
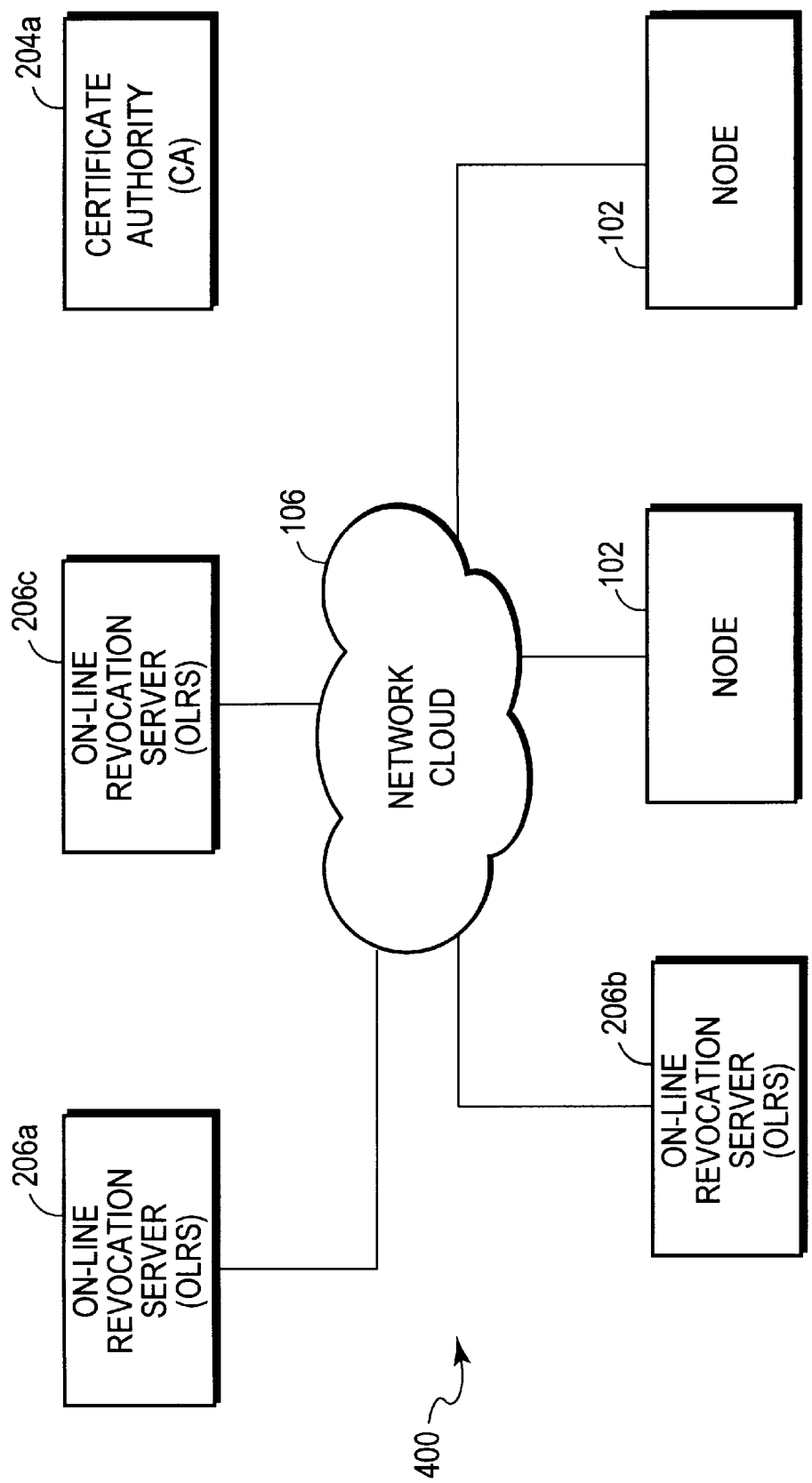
FIG. 4 is a highly schematic functional diagram of yet another embodiment of the system of the present invention.
Figure 5:
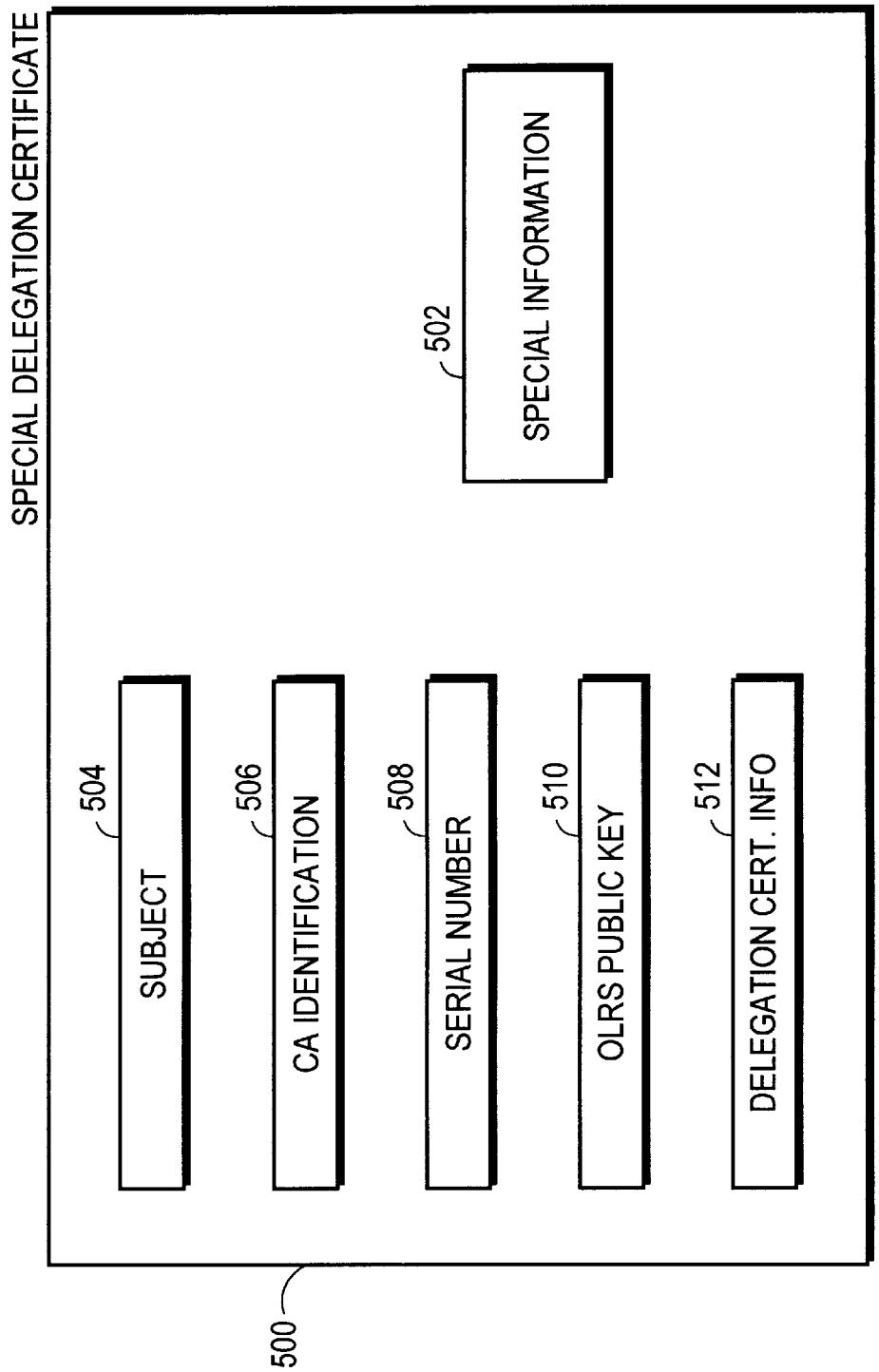
FIG. 5 is a symbolic representation of the data structure of a special delegation certificate used in the embodiment of FIG. 2.

Turning now to FIG. 4, yet another embodiment 400 of the system of the present invention will be described. System 400 includes a CA 204a, and a plurality of online revocation servers 206a, 206b, 206c associated with the single CA 204a, and one or more nodes 102, connected together via network medium 106. Each OLRS 206a, 206b, 206c initially is present in the system 400 (i.e., prior to compromise of an OLRS 206a), and in order to illustrate this, each OLRS is shown in solid lines in FIG. 4. Except as stated herein, the functions and operation of the CA 204a, OLRS 206a, and one or more nodes 102 in system 400 are substantially the same as their counterparts in system 300. Likewise, each OLRS 206b, 206c is of identical construction and initially provides the same revocation services as OLRS 206a.

Initially, each OLRS 206a, 206b, 206c receives an identical delegation certificate from the CA 204a, which certificate identifies each of the OLRS 206a, 206b, 206c as being authorized to provide certificate revocation status information, and the respective public keys of each OLRS 206a, 206b, 206c. As in the other embodiments, the delegation certificate is signed by the private key of the CA 204a, but may also include optional information, such as the network addresses of each OLRS 206a, 206b, 206c and CA 204a.

In embodiment 400, each time the CA 204a updates its master CRL, the CA 204a incorporates into the master CRL time stamp and version information to indicate when the master CRL was last updated and the version number of that update. Each time the servers 206a, 206b, 206c update their respective certificate revocation status information based upon the information contained in the master CRL, the most recent time stamp and version number information of master CRL are stored by the servers 206a, 206b, 206c.

In system 400, one or more of the nodes 102 is configured to periodically audit certificate revocation status information provided by each OLRS 206a, 206b, 206c in order to determine whether discrepancies exist in such information that may indicate that one or more of the OLRS have been compromised. More specifically, one or more of the nodes 102 may periodically query the servers 206a, 206b, 206c as to the revocation status of specific certificates issued by the CA 204a, and compare the status information provided by the servers 206a, 206b, 206c as a result of such queries with the corresponding revocation status information contained in the current master CRL.

If a difference exists in revocation status between that reported by a given OLRS 206a and that contained in the master CRL, that OLRS 206a is flagged by the node 102 as potentially being compromised. The node 102 then may query the OLRS 206a for the latest master CRL version and date stamp that the OLRS 206 has recorded; alternatively, each OLRS may be configured to provide this information with each query result. If the actual most recent time stamp and version of the master CRL and those recorded by the OLRS 206a do not differ, this indicates that the OLRS 206a is not functioning properly and/or has been compromised, and is treated by the nodes 102 as having been compromised. Conversely, if the actual time stamp and version of the master CRL do differ from those reported by the OLRS 206a, then OLRS 206a is designated as potentially being compromised, and further investigation may be undertaken to determine whether it is in fact compromised.

The CA 204a then may be informed by one or more of the nodes 102 that OLRS 206a has potentially been compromised, and may update its master CRL to indicate that the previous delegation certificate that it issued authorizing each OLRS 206a, 206b, 206c is now revoked, and may issue updates, via secure off-line communicate techniques, to each of the uncompromised OLRS 206b, 206c to update their certificate revocation status information to reflect this change in revocation status of the previously issued delegation certificate.

CA 204a next issues, via secure off-line communications, another delegation certificate, signed using the private key of the CA 204a, that lists only the uncompromised OLRS 206b, 206c as being authorized to provide certificate revocation status information. This delegation certificate contains appropriate additional information (e.g., an OLRS generation number, time stamp, etc.) that indicates that it was issued subsequent to the first delegation certificate that authorized each OLRS 206a, 206b, 206c to provide certificate revocation status information. Alternatively, CA 204a may issue a separate delegation certificate for each OLRS. In the event that the OLRS 206a becomes compromised the delegation certificate to 206a can be revoked by OLRS 206b, c.

In system 400, each time a verifying principal (e.g., one or more of the nodes 102) undertakes an authentication exchange, the principal may query at least two different OLRS (e.g., 206a, 206b) to compare the results of the queries and the delegation certificates provided by each of the OLRS. In this case, since the principal may receive two different delegation certificates and, potentially, contradictory query results, the principal may then request, via a secure off-line communications technique, that the CA 204a provide to the principal a copy of the delegation certificate that was most recently issued by the CA 204a. As noted above, this delegation certificate indicates that the OLRS 206a is not authorized, but OLRS 206b is authorized to provide certificate revocation status information. The principal will thereafter treat as invalid the certificate revocation information provided by the OLRS 206a.

Additionally, when querying the servers 206a, 206b, 206c for revocation status information, a node 102 may conceal its identity using conventional techniques (e.g., obtaining the information via surrogate nodes in the network) so as to prevent a compromised OLRS (e.g., 206a) from concealing the fact that it has been compromised (e.g., by providing accurate revocation status information only to that node 102, but otherwise providing corrupted status information).

Of course, although the nodes 102 have been described as carrying out the above OLRS certificate revocation status information auditing, any node in the system 400, if appropriately modified, could carry out such auditing. For example, if system 400 is appropriately modified in ways apparent to those skilled in the art, each OLRS could carry out such auditing and report the results of same to the CA 204a whereby to permit the CA 204a to take further appropriate action, as described above. Likewise, although the OLRS auditing has been described as being carried out on a periodic basis, it may instead be carried out at random times or on a "spot" check basis.

Additionally, although the auditing functions of nodes 102 have been described in connection with system 400, if appropriately modified, the other embodiments 200, 300 may also utilize similar auditing techniques to determine whether an OLRS has been compromised. Additionally, embodiment 300 could be modified to use multiple OLRS and techniques described in connection with embodiment 400.

Other modifications are also possible. For example, as an alternative to the above-described auditing techniques, or in addition thereto, verifying principals may be configured to always access and compare the results of revocation status queries provided by at least two OLRS in system 400, and if a discrepancy (i.e., difference) between the two query results exists, to inform the CA 204a to enable the CA 204a to undertake further appropriate action. Alternatively, a verifying principal may be configured to access and store certificate revocation status information from one OLRS (e.g., the OLRS physically closest to the verifying principal) during a first authentication exchange, and thereafter, during a subsequent authentication exchange, to access such information from a different OLRS, and to compare the two sets of information for differences.

Also, it should be understood that although each of authorities 204a, 204b may be thought of as being separate logical entities in system 200, they may comprise the same physical node, which node may be programmed to implement multiple processes to carry out the aforesaid operations described as being carried out by CA 204a, 204b. Additionally, although the certificate authorities have been described as being off-line network entities, they may instead be on-line entities. Further, the key pairs used by certificate authorities and/or other nodes of the network may be hardcoded onto conventional removable token/smart cards which may be read by conventional token/smart card readers comprised in said nodes to permit the nodes to obtain their respective key pairs. Additionally, the public key(s) of one or more certificate authorities and the most recent OLRS generation number associated with same may be initially preconfigured (i.e., "precertified") into node(s) 102 of the network.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A computerized authentication system, comprising:
a first revocation server (RS) for issuing certificate revocation information;
a first certificate authority (CA) for issuing, if the first RS is compromised, a delegation certificate indicating that certificates issued by a second CA prior to issuance of said delegation certificate should be considered valid unless indicated by a second RS to be revoked and also indicating that only information provided by the second RS concerning revocation status of the certificates issued by the second CA should be considered valid, the second CA also being for issuing, if the first RS is compromised, a renunciation certificate indicating renouncement of certification authority of said second CA in favor of said first CA; and
a third CA for certifying respective keys of said first and second certificate authorities and being configured to issue an acknowledgement message in response to receipt of said renunciation certificate.

2. A computerized authentication system, comprising:
a first revocation server (RS) for providing information related to certificates issued by a first certificate authority (CA) that have been revoked, said CA being for issuing, if the first RS is compromised, a delegation certificate indicating that said first RS is no longer authorized to provide said information and that certificates previously issued by said CA remain valid unless indicated by a second RS to be revoked, the delegation certificate also indicating that only information provided by the second RS concerning revocation status of the certificates issued by the CA should be considered valid since the first RS is compromised, and a second CA for certifying a key of the first CA and being configured to issue an acknowledgement message in response to receipt of a renunciation certificate from the first CA, the renunciation certificate indicating renouncement of certification authority of the first CA in favor of a third CA.

3. A system according to claim 2, wherein said delegation certificate also includes a RS generation number that specifies an order in which the delegation certificate was signed by said first CA relative to an earlier signed delegation certificate.

4. A system according to claim 2, further comprising a third RS also for providing certificate revocation information, and a node that is configured to compare the information provided by at least two of said revocation servers.

5. A system according to claim 4, further comprising a node configured to determine whether respective certificate revocation information provided by one RS is valid based upon comparison of the respective certificate revocation information to other respective certificate revocation information from another RS.

6. A system according to claim 4, further comprising an auditor for comparing respective certificate revocation information provided by each revocation server to a master certificate revocation list.

7. A computerized authentication process, comprising:
   authorizing a first revocation server (RS) to provide information concerning revoked certificates issued by a first certificate authority (CA);
   if the first RS is compromised, authorizing a second RS to provide said information while permitting certificates issued by said CA to remain valid unless indicated by said second RS to be revoked, and permitting only said information provided by the second RS to be considered valid; and
   a second CA for certifying a key of the first CA and being configured to issue an acknowledgement message in response to receipt of a renunciation certificate from the first CA, the renunciation certificate indicating renouncement of certification authority of the first CA in favor of a third CA.

8. A process according to claim 7, wherein the information provided by said second RS indicates that a delegation certificate issued by said CA for said first RS has been revoked.

9. A computerized authentication process, comprising:
   authorizing a plurality of revocation servers to provide information concerning certificates issued by a first certificate authority (CA) that have been revoked;
   comparing the information provided by at least two of said servers whereby to determine whether difference exists therebetween;
   determining, based at least upon whether said difference exists, whether revocation server compromise has occurred;
   if said revocation server compromise is determined to have occurred, permitting only certificate revocation information provided by at least one uncompromised revocation server to be considered valid; and
   providing a second CA for certifying a key of the first CA and configuring the second CA to issue an acknowledgement message in response to receipt of a renunciation certificate from the first CA, the renunciation certificate indicating renouncement of certification authority of the first CA in favor of a third CA.

10. A process according to claim 9, wherein if said revocation server compromise is determined to have occurred, said process further comprises revoking authorization of a compromised revocation server to provide the certificate revocation information.

11. A system according to claim 3, further comprising another CA for issuing another certificate certifying a CA public key, said another certificate including said RS generation number.

12. A system according to claim 3, further comprising a node that is preconfigured with a CA public key and said RS generation number.

13. Computer readable memory storing executable program instructions comprising instructions which when executed cause:
   a first revocation server (RS) to issue certificate revocation information;
   a first certificate authority (CA) to issue, if the first RS is compromised, a delegation certificate indicating that certificates issued by a second CA prior to issuance of said delegation certificate should be considered valid unless indicated by a second RS to be revoked and also indicating that only information provided by the second RS concerning revocation status of the certificates issued by the second CA should be considered valid, the second CA also being for issuing, if the first RS is compromised, a renunciation certificate indicating renouncement of certification authority of said second CA in favor of said first CA; and
   a third CA to certify respective keys of said first and second certificate authorities and to issue an acknowledgement message in response to receipt of said renunciation certificate.

14. Computer readable memory storing executable program instructions comprising instructions which when executed cause:
   a first revocation server (RS) to provide information related to certificates issued by a first certificate authority (CA) that have been revoked;
   said CA to issue, if the first RS is compromised, a delegation certificate indicating that said first RS is no longer authorized to provide said information and that certificates previously issued by said CA remain valid unless indicated by a second RS to be revoked, the delegation certificate also indicating that only information provided by the second RS concerning revocation status of the certificates issued by the CA should be considered valid since the first RS is compromised, and a second CA to certify a key of the first CA and to issue an acknowledgement message in response to receipt of a renunciation certificate from the first CA, the renunciation certificate indicating renouncement of certification authority of the first CA in favor of a third CA.

15. A computer data signal embodied in a carrier wave and representing executable instructions comprising instructions for:
   authorizing a first revocation server (RS) to provide information concerning revoked certificates issued by a first certificate authority (CA);
   if the first RS is compromised, authorizing a second RS to provide said information while permitting certificates issued by said CA to remain valid unless indicated by said second RS to be revoked, and permitting only said information provided by the second RS to be considered valid; and
   causing a second CA to certify a key of the first CA and to issue an acknowledgement message in response to receipt of a renunciation certificate from the first CA, the renunciation certificate indicating renouncement of certification authority of the first CA in favor of a third CA.

16. A computer data signal embodied in a carrier wave and representing executable instructions comprising instructions for:

authorizing a plurality of revocation servers to provide information concerning certificates issued by a first certificate authority (CA) that have been revoked;

comparing the information provided by at least two of said servers whereby to determine whether difference exists therebetween;

determining, based at least upon whether said difference exists, whether revocation server compromise has occurred;

if said revocation server compromise is determined to have occurred, permitting only certificate revocation information provided by at least one uncompromised revocation server to be considered valid; and providing a second CA for certifying a key of the first CA and configuring the second CA to issue an acknowledgement message in response to receipt of a renunciation certificate from the first CA, the renunciation certificate indicating renouncement of certification authority of the first CA in favor of a third CA.

17. A computerized authentication system, comprising:

means for authorizing a first revocation server (RS) to provide information concerning revoked certificates issued by a first certificate authority (CA);

means for authorizing, if the first RS is compromised, a second RS to provide said information while permitting certificates issued by said CA to remain valid unless indicated by said second RS to be revoked, and means for permitting only said information provided by the second RS to be considered valid; and means for causing a second CA to certify a key of the first CA and to issue an acknowledgement message in response to receipt of a renunciation certificate from the first CA, the renunciation certificate indicating renouncement of certification authority of the first CA in favor of a third CA.

18. A computerized authentication system, comprising:

means for authorizing a plurality of revocation servers to provide information concerning certificates issued by a first certificate authority (CA) that have been revoked;

means for comparing the information provided by at least two of said servers whereby to determine whether difference exists therebetween;

means for determining, based at least upon whether said difference exists, whether revocation server compromise has occurred;

means for, if said server compromise is determined to have occurred, permitting only certificate revocation information provided by at least one uncompromised revocation server to be considered valid; and means for causing a second CA to certify a key of the first CA and to issue an acknowledgement message in response to receipt of a renunciation certificate from the first CA, the renunciation certificate indicating renouncement of certification authority of the first CA in favor of a third CA.

19. A computer data signal according to claim 16, wherein the executable instructions further comprise instructions for revoking authorization, if said revocation server compromise is determined to have occurred, of a compromised revocation server to provide the certificate revocation information.

20. A computerized authentication system, comprising:

a first revocation server (RS) for being authorized to provide information concerning revoked certificates issued by a first certificate authority (CA);

a second revocation server (RS) for being authorized, if the first RS is compromised, to provide said information while permitting certificates issued by said CA to remain valid unless indicated by said second RS to be revoked, only the information being provided by the second RS being permitted to be considered valid, and a second CA to certify a key of the first CA and to issue an acknowledgement message in response to receipt of a renunciation certificate from the first CA, the renunciation certificate indicating renouncement of certification authority of the first CA in favor of a third CA.

21. A system according to claim 20, wherein the information provided by said second RS indicates that a delegation certificate issued by said CA for said first RS has been revoked.

22. A computerized system, comprising:

an auditor for comparing information provided by one or more servers whereby to determine whether possible compromise of said one or more servers exists;

wherein if the auditor determines that the possible compromise exists, only the information provided by at least one uncompromised server is permitted to be considered valid and authorized; and a first certificate authority (CA) to certify a key of a second CA and to issue an acknowledgement message in response to receipt of a renunciation certificate from the second CA, the renunciation certificate indicating renouncement of certification authority of the second CA in favor of a third CA.

23. A system according to claim 22, wherein said auditor compares respective information provided by two servers for differences whereby to determine whether said possible compromise exists.

24. A system according to claim 22, wherein said auditor is configured to mask identity of said auditor.

25. A system according to claim 22, wherein said one or more servers comprises one or more revocation servers.

26. A system according to claim 22, wherein said information comprises information concerning certificates that have been revoked.

27. A system according to claim 22, wherein said one or more servers comprises at least three servers for providing certificate revocation information, and said auditor is configured to compare the certificate revocation information provided by at least two of said at least three servers.

28. A system according to claim 26, wherein said auditor is also configured to determine whether respective certificate revocation information provided by one revocation server (RS) is valid based upon comparison of the respective certificate revocation information to other respective certificate revocation information from another RS.

29. A system according to claim 26, wherein said auditor is also configured to compare respective certificate revocation information provided by each server to a master certificate revocation list.

30. A system according to claim 22, wherein said auditor comprises a computer network node that is not comprised in said one or more servers.

31. A computerized process, comprising:

comparing information provided by one or more servers whereby to audit said one or more servers to determine whether possible compromise of said one or more servers exists;

if the possible compromise is determined to exist, permitting only the information provided by at least one uncompromised server to be considered valid and authorized; and providing a first certificate authority (CA) to certify a key of a second CA and to issue an acknowledgement message in response to receipt of a renunciation certificate from the second CA, the renunciation certificate indicating renouncement of certification authority of the second CA in favor of a third CA.

32. A process according to claim 31, wherein the step of comparing comprises comparing respective information provided by two servers for differences whereby to determine whether said possible compromise exists.

33. A process according to claim 31, wherein an auditor is used to carry out the step of comparing, and said process further comprises masking identity of said auditor.

34. A process according to claim 31, wherein said one or more servers comprises one or more revocation servers.

35. A process according to claim 31, wherein said information comprises information concerning certificates that have been revoked.

36. A process according to claim 31, wherein said one or more servers comprises at least three servers for providing certificate revocation information, and an auditor is provided that is configured to compare the certificate revocation information provided by at least two of said at least three servers.

37. A process according to claim 35, further comprising determining whether respective certificate revocation information provided by one revocation server (RS) is valid based upon comparison of the respective certificate revocation information to other respective certificate revocation information from another RS.

38. A process according to claim 35, further comprising comparing respective certificate revocation information provided by each server to a master certificate revocation list.

39. A process according to claim 31, wherein the step of comparing is carried out by a computer network node that is not comprised in said one or more servers.

40. A computerized system, comprising:
  means for comparing information provided by one or more servers whereby to audit said one or more servers to determine whether possible compromise of said one or more servers exists;
  means for, if the possible compromise is determined to exist, permitting only the information provided by at least one uncompromised server to be considered valid and authorized; and
  means for causing a first certificate authority (CA) to certify a key of a second CA and to issue an acknowledgement message in response to receipt of a renunciation certificate from the second CA, the renunciation certificate indicating renouncement of certification authority of the second CA in favor of a third CA.

41. A system according to claim 40, wherein the comparing means compares respective information provided by two servers for differences whereby to determine whether said possible compromise exists.

42. A system according to claim 40, further comprising means for masking identity of said means for comparing.

43. A system according to claim 40, wherein said one or more servers comprises one or more revocation servers.

44. A system according to claim 40, wherein said information comprises information concerning certificates that have been revoked.

45. A system according to claim 40, wherein said one or more servers comprises at least three servers for providing certificate revocation information, and said means for comparing is configured to compare the certificate revocation information provided by at least two of said at least three servers.

46. A system according to claim 44, further comprising means for determining whether respective certificate revocation information provided by one revocation server (RS) is valid based upon comparison of the respective certificate revocation information to other respective certificate revocation information from another RS.

47. A system according to claim 44, further comprising means for comparing respective certificate revocation information provided by each server to a master certificate revocation list.

48. A system according to claim 40, wherein the means for comparing comprises a computer network node that is not comprised in said one or more servers.

49. Computer readable memory storing executable program instructions comprising instructions which when executed cause:
  comparison of information provided by one or more servers whereby to audit said one or more servers to determine whether possible compromise of said one or more servers exists;
  if the possible compromise is determined to exist, permitting only the information provided by at least one uncompromised server to be considered valid and authorized; and
  causing a first certificate authority (CA) to certify a key of a second CA and to issue an acknowledgement message in response to receipt of a renunciation certificate from the second CA, the renunciation certificate indicating renouncement of certification authority of the second CA in favor of a third CA.

50. A memory according to claim 49, wherein said comparison comprises comparing respective information provided by two servers for differences whereby to determine whether said possible compromise exists.

51. A memory according to claim 49, further comprising instructions which when executed cause masking of an identity of a node used to carry out said comparison.

52. A computer data signal embodied in a carrier wave and representing executable program instructions comprising instructions for:
  comparing information provided by one or more servers whereby to audit said one or more servers to determine whether possible compromise of said one or more servers exists;
  if the possible compromise is determined to exist, permitting only the information provided by at least one uncompromised server to be considered valid and authorize; and
  causing a first certificate authority (CA) to certify a key of a second CA and to issue an acknowledgement message in response to receipt of a renunciation certificate from the second CA, the renunciation certificate indicating renouncement of certification authority of the second CA in favor of a third CA.

53. A signal according to claim 52, wherein the instructions comprised in the program instructions are also for comparing respective information provided by two servers for differences whereby to determine whether said possible compromise exists.

54. A signal according to claim 52, wherein the instructions comprised in the program instructions are also for masking of an identity of a node used to carry out comparison of the information provided by the one or more servers.

55. A computerized authentication process, comprising:
  issuing certificate revocation information from a first revocation server (RS);

if the first RS is compromised, issuing from a first certificate authority (CA) a delegation certificate indicating that certificates issued by a second CA prior to issuance of said delegation certificate should be considered valid unless indicated by a second RS to be revoked and also indicating that only information provided by the second RS concerning revocation status of the certificates issued by the second CA should be considered valid;

issuing from the second CA, if the first RS is compromised, a renunciation certificate indicating renouncement of certification authority of said second CA in favor of said first CA; and providing a third CA to certify respective keys of said first and second certificate authorities and to issue an acknowledgement message in response to receipt of said renunciation certificate.

56. A process according to claim 55, also comprising, if the first RS is compromised, issuing from the second CA a renunciation certificate indicating renouncement of certification authority of said second CA in favor of said first CA.

57. A process according to claim 55, wherein said delegation certificate also includes a RS generation number that specifies an order in which the delegation certificate was signed relative to an earlier signed delegation certificate.

58. A process according to claim 55, also comprising providing a third RS for providing certificate revocation information, and also providing a node that is configured to compare the information provided by at least two of said revocation servers.

59. A process according to claim 58, also comprising providing a node configured to determine whether respective certificate revocation information provided by one RS is valid based upon comparison of the respective certificate revocation information to other respective certificate revocation information from another RS.

60. A process according to claim 58, further comprising providing an auditor for comparing respective certificate revocation information provided by each revocation server to a master revocation list.

61. A computerized authentication process, comprising:

providing a first revocation server (RS) for providing information related to certificates issued by a first certificate authority (CA) that have been revoked;

if said first RS is compromised, issuing from said CA a delegation certificate indicating that said first RS is no longer authorized to provide said information and that certificates previously issued by said CA remain valid unless indicated by a second RS to be revoked, the delegation certificate also indicating that only information provided by the second RS concerning revocation status of the certificates issued by the CA should be considered valid since the first RS is compromised; and providing a second CA for certifying a key of the first CA and for issuing an acknowledgement message in response to receipt of a renunciation certificate from the first CA, the renunciation certificate indicating renouncement of certification authority of the first CA in favor of a third CA.

62. A process according to claim 61, wherein said delegation certificate also includes a RS generation number that specifies an order in which the delegation certificate was signed by said first CA relative to an earlier signed delegation certificate.

63. A process according to claim 61, further comprising providing a third RS for providing certificate revocation information, and also providing a node configured to compare the information provided by at least two of said revocation servers.

64. A process according to claim 63, further comprising providing a node configured to determine whether respective certificate revocation information provided by one RS is valid based upon comparison of the respective certificate revocation information to other respective certificate revocation information from another RS.

65. A process according to claim 63, further comprising providing an auditor for comparing respective certificate revocation information provided by each revocation server to a master certificate revocation list.

66. A computerized authentication system, comprising:

a plurality of revocation servers authorized to provide information concerning certificates issued by a first certificate authority (CA) that have been revoked;

a comparison mechanism for comparing the information provided by at least two of said servers whereby to determine whether difference exists therebetween;

a determination mechanism for determining, based at least upon whether said difference exists, whether revocation server compromise has occurred;

if said revocation server compromise is determined to have occurred, permitting only certificate revocation information provided by at least one uncompromised revocation server to considered valid; and a second CA for certifying a key of the first CA and for issuing an acknowledgement message in response to receipt of a renunciation certificate from the first CA, the renunciation certificate indicating renouncement of certification authority of the first CA in favor of a third CA.

67. A system according to claim 66, further comprising a mechanism for revoking authorization of a compromised revocation server to provide certificate revocation information if said revocation server compromise is determined to have occurred.

68. A process according to claim 57, further comprising providing another CA for issuing another certificate certifying a CA public key, said another certificate including said RS generation number.

69. A process according to claim 57, further comprising providing a node that is preconfigured with a CA public key and said RS generation number.

70. A system according to claim 1, wherein compromise of the first RS comprises at least one of unauthorized access to a cryptographic key of the first RS, unauthorized tampering with the key, unauthorized access to certificate revocation status information, and unauthorized tampering with certificate revocation status information.

71. A system according to claim 2, wherein compromise of the first RS comprises at least one of unauthorized access to a cryptographic key of the first RS, unauthorized tampering with the key, unauthorized access to certificate revocation status information, and unauthorized tampering with certificate revocation status information.

72. A process according to claim 7, wherein compromise of the first RS comprises at least one of unauthorized access to a cryptographic key of the first RS, unauthorized tampering with the key, unauthorized access to certificate revocation status information, and unauthorize tampering with certificate revocation status information.

73. A process according to claim 9, wherein said compromise results from at least one of unauthorized access to a cryptographic key, unauthorized tampering with the key, unauthorized access to certificate revocation status information, and unauthorize tampering with certificate revocation status information.

74. A memory according to claim 13, wherein compromise of the first RS comprises at least one of unauthorized access to a cryptographic key of the first RS, unauthorized tampering with the key, unauthorized access to certificate revocation status information, and unauthorize tampering with certificate revocation status information.

75. A memory according to claim 14, wherein compromise of the first RS comprises at least one of unauthorized access to a cryptographic key of the first RS, unauthorized tampering with the key, unauthorized access to certificate revocation status information, and unauthorize tampering with certificate revocation status information.

76. A signal according to claim 15, wherein compromise of the first RS comprises at least one of unauthorized access to a cryptographic key of the first RS, unauthorized tampering with the key, unauthorized access to certificate revocation status information, and unauthorize tampering with certificate revocation status information.

77. A signal according to claim 16, wherein said compromise results from at least one of unauthorized access to a cryptographic key, unauthorized tampering with the key, unauthorized access to certificate revocation status information, and unauthorize tampering with certificate revocation status information.

78. A system according to claim 17, wherein compromise of the first RS comprises at least one of unauthorized access to a cryptographic key of the first RS, unauthorized tampering with the key, unauthorized access to certificate revocation status information, and unauthorize tampering with certificate revocation status information.

79. A system according to claim 18, wherein the compromise results from at least one of unauthorized access to a cryptographic key, unauthorized tampering with the key, unauthorized access to certificate revocation status information, and unauthorize tampering with certificate revocation status information.

80. A system according to claim 20, wherein compromise of the first RS comprises at least one of unauthorized access to a cryptographic key of the first RS, unauthorized tampering with the key, unauthorized access to certificate revocation status information, and unauthorize tampering with certificate revocation status information.

81. A system according to claim 22, wherein the possible compromise results from at least one of unauthorized access to a cryptographic key, unauthorized tampering with the key, unauthorized access to certificate revocation status information, and unauthorize tampering with certificate revocation status information.

82. A process according to claim 31, wherein the possible compromise results from at least one of unauthorized access to a cryptographic key, unauthorized tampering with the key, unauthorized access to certificate revocation status information, and unauthorize tampering with certificate revocation status information.

83. A system according to claim 40, wherein the possible compromise results from at least one of unauthorized access to a cryptographic key, unauthorized tampering with the key, unauthorized access to certificate revocation status information, and unauthorize tampering with certificate revocation status information.

84. A memory according to claim 49, wherein the possible compromise results from at least one of unauthorized access to a cryptographic key, unauthorized tampering with the key, unauthorized access to certificate revocation status information, and unauthorize tampering with certificate revocation status information.

85. A signal according to claim 52, wherein the possible compromise results from at least one of unauthorized access to a cryptographic key, unauthorized tampering with the key, unauthorized access to certificate revocation status information, and unauthorize tampering with certificate revocation status information.

86. A process according to claim 61, wherein compromise of the first RS comprises at least one of unauthorized access to a cryptographic key of the first RS, unauthorized tampering with the key, unauthorized access to certificate revocation status information, and unauthorize tampering with certificate revocation status information.

87. A system according to claim 66, wherein compromise results from at least one of unauthorized access to a cryptographic key, unauthorized tampering with the key, unauthorized access to certificate revocation status information, and unauthorize tampering with certificate revocation status information.

* * * * *